United States Patent
Gopalakrishnan et al.

(10) Patent No.: US 9,773,003 B2
(45) Date of Patent: Sep. 26, 2017

(54) COMPUTER IMPLEMENTED SYSTEM AND METHOD FOR INVESTIGATIVE DATA ANALYTICS

(71) Applicant: XURMO TECHNOLOGIES PVT. LTD, Bangalore (IN)

(72) Inventors: Sridhar Gopalakrishnan, Bangalore (IN); Davis Verghese, Bangalore (IN); Saurabh Santosh, Bangalore (IN)

(73) Assignee: XURMO TECHNOLOGIES PVT. LTD., Karnataka (IN)

( * ) Notice: Subject to any disclaimer, the term of this patent is extended or adjusted under 35 U.S.C. 154(b) by 259 days.

(21) Appl. No.: 14/612,288

(22) Filed: Feb. 2, 2015

(65) Prior Publication Data

US 2016/0162496 A1   Jun. 9, 2016

(30) Foreign Application Priority Data

Dec. 9, 2014   (IN) .......................... 6207/CHE/2014

(51) Int. Cl.
*G06F 17/30*   (2006.01)

(52) U.S. Cl.
CPC .. *G06F 17/30076* (2013.01); *G06F 17/30194* (2013.01); *G06F 17/30339* (2013.01); *G06F 17/30483* (2013.01); *G06F 17/30539* (2013.01); *G06F 17/30545* (2013.01)

(58) Field of Classification Search
CPC ......... G06F 17/30076; G06F 17/30545; G06F 17/30339; G06F 17/30483; G06F 17/30194; G06F 17/30539
USPC ..................................................... 707/756
See application file for complete search history.

(56) References Cited

U.S. PATENT DOCUMENTS

| | | | | |
|---|---|---|---|---|
| 8,214,323 B2* | 7/2012 | Zigon | .............. | G06F 19/366 707/602 |
| 8,799,489 B2* | 8/2014 | Suen | .............. | G06F 17/30522 709/229 |
| 9,218,408 B2* | 12/2015 | Mascarenhas | .... | G06F 17/30489 |
| 2002/0161757 A1* | 10/2002 | Mock | .............. | G06F 17/30386 |
| 2007/0027904 A1* | 2/2007 | Chow | .............. | G06F 17/30592 |
| 2007/0226339 A1* | 9/2007 | Suen | .............. | G06F 17/30522 709/226 |
| 2008/0077558 A1* | 3/2008 | Lawrence | .......... | G06F 17/30867 |
| 2014/0156696 A1* | 6/2014 | Goel | .............. | G06F 17/30398 707/769 |

* cited by examiner

*Primary Examiner* — Jean M Corrielus
(74) *Attorney, Agent, or Firm* — Barry Choobin; Patent 360 LLC

(57) ABSTRACT

An analytical database server and a method for enabling investigative data analytics have been disclosed. The database server comprises a data loader that receives data from a plurality of data sources, and loads the received source data tables onto a Hadoop Distributed File System (HDFS). A processor processes the source data tables loaded onto the HDFS and assigns a unique turf row (TR) identifier to each of the records present in the source data tables. The source data tables and the corresponding metadata are organized into a first data table, a second data table and a third data table. The first table comprises a record for each of the received source data tables. The second data table stores, in the form of an inverted list, the data originally contained in the received source data tables. The third data table stores the unidirectional relationships between the source data tables.

9 Claims, 4 Drawing Sheets

COMPUTER IMPLEMENTED SYSTEM AND METHOD FOR INVESTIGATIVE DATA ANALYTICS

CROSS REFERENCE TO RELATED APPLICATIONS

This patent application claims the priority of the Indian Provisional Patent Application No. 6207/CHE/2014 filed on Dec. 9, 2014, having the title "A Method And System For Instantly Analysing Big Data", and the content of which is incorporated herein by reference in its entirely.

TECHNICAL FIELD

The embodiments herein relate to the field of database servers. Particularly, the embodiments herein relates to analytical database servers. More particularly, the embodiments herein relate to a database server having a storage model conducive for free-format forms of analytics including investigative analytics.

DESCRIPTION OF THE RELATED ART

The analytical and reporting requirements of data analysts typically change with respect to time, and also with respect to the purported resultant of data analysis. With the advent of computer technology, and data storage mechanisms in particular, a new form of analytics termed as investigative analytics has come to the foray. Investigative analytics provide for free-style navigation and data querying, and are generally not exposed to the restrictions imposed by conventional database structures.

However, the conventional database structures limit a user's ability to perform investigative analytics, since the data, in case of conventional database structures is defined in terms of relationships between the tables of the database. The issue with conventional databases is that the user is required to preempt the data structures of the tables and columns, apart from understanding the defined/undefined relationships between the tables. Further, even though some of the conventional database systems support a variety of query language implementations, the queries thereof cannot be changed dynamically with reference to changes in the data sources.

Considering a scenario of decline in sales of a particular article across a particular geographic area, investigative analytics is deemed necessary to pinpoint the exact cause of the decline. However, conventional reporting tools working with conventional database systems would not be able to pinpoint to the exact cause of decline unless they have been modeled to explain that particular scenario. Conventional analytical tools that work with conventional database systems do analyze data from all the available angles and at each possible level of detail, but these tools can only discover relationships between data elements via links, relations, keys and dimensions that have been pre-defined in the database.

Further, the conventional statistical tools and data mining tools which are typically used in conjunction with conventional database systems also do not assist users in performing investigative analytics. Albeit powerful, conventional statistical tools and data mining tools can create models only on the data that has been supplied and modeled beforehand.

Therefore, there was felt a need for a computer implemented system, preferably a database server that would enable the users to query, browse, and analyze data without any restrictions. There was felt a need for a database server that would enable a user to relate data elements for which no relationships or tables have been pre-defined. Further, there was also felt a need for a database server that would fetch the data required by the user, efficiently and effectively.

The above mentioned shortcomings, disadvantages and problems are addressed herein and which will be understood by reading and studying the following specification.

Objectives of the Embodiments

The primary object of the embodiments herein is to provide a database server that enables free-form querying.

Another object of the embodiments herein is to provide a database server that is able to access all varieties of data sources directly, without the need for modeling the data beforehand.

Yet another object of the embodiments herein is to provide a database server that seamlessly integrates a new data source with the existing data, without necessitating a study of the data structure and the contents thereof.

Yet another object of the embodiments herein is to provide a database server that is equipped with analytical techniques including but not restricted to clustering, forecasting and classifications.

Yet another object of the embodiments herein is to provide a performance oriented database server that is capable of fetching the data/information requested by the user, at a quick rate and with low turnaround periods.

Yet another object of the embodiments herein is to provide a database server that provides data/information up to lowest possible level of detail.

Yet another object of the embodiments herein is to provide a database server that does not mandate the user to be aware of the structure of data, be it tables, rows or columns.

Yet another object of the embodiments herein is to provide a database server that does not mandate the user to be aware of undefined relationships between the corresponding data tables.

Yet another object of the embodiments herein is to provide a database server that supports investigative analytics.

Yet another object of the embodiments herein is to provide a database server that allows users to query for any data/information without being restricted by the underlying data structures, and without having to understand all the undefined relationships, and without having to know what each data column actually means.

Yet another object of the embodiments herein is to provide a database server that is capable of handling dynamic data structures.

Yet another object of the embodiments herein is to provide a database server that stores the data in a non-traditional data structure.

Yet another object of the embodiments herein is to provide a database server which accommodates data from diversified sources, irrespective of the underlying data structure.

These and other objects and advantages of the embodiments herein will become readily apparent from the following detailed description taken in conjunction with the accompanying drawings.

SUMMARY

The embodiments herein envisage a computer implemented analytical database server. The database server, in accordance with the embodiments herein comprises a data loader that receives data from a plurality of sources, and stores the data in a tabular format, thereby creating a plurality of source data tables. The data loader loads the received source data, in a tabular format onto a distributed files system such as the Hadoop Distributed File System (HDFS). A processor cooperates with the Hadoop Distributed File System to process the source data tables loaded thereto. The processor reorganizes the data contained in the source data tables, and the corresponding metadata into at least one first data table, second data table and third data table.

The first data table comprises unique numerical identifiers assigned to respective source data tables. The first data table further comprises unique first identifiers corresponding to each of the columns of respective source data tables. The first identifiers are linked to at least one of the unique numerical identifiers. The first data table further comprises the original names of respective source data tables.

The second data table comprises a plurality of second identifiers mapped to the respective first identifiers stored in the first data table. The second data table further comprises a plurality of third identifiers mapped to the respective numerical identifiers stored in the first table. The second data table further stores the data reorganized by the processor, wherein the data reorganized by the processor is linked to the second identifiers and the third identifiers.

The third data table stores the unique numerical identifiers representing respective source data tables, in the form of unidirectional relationship notations.

The database server, in accordance with the embodiments herein comprises a query builder which receives at least one keyword from a user, and queries the first table to identify the source data table relevant to the keyword. The query builder further determines from the first table, the unique numerical identifier corresponding to the identified source data table.

The query builder further identifies from the first table, the first identifiers linked to the identified unique numerical identifier. The query builder further queries the second data table to identify the second identifiers mapped onto the first identifiers. The query builder further queries the second data table to identify the third identifiers mapped to the identified numerical identifier.

The query builder further queries the second data table to elicit the data linked to the second identifiers and third identifiers, and displays the elicited data to the user along with information including the source data table name and source data table column name, in which the elicited data was located.

In accordance with the embodiments herein, the second data table is configured to store the data reorganized by the processor, in the form of an inverted list.

In accordance with the embodiments herein, the first identifier and second identifier are equivalent.

In accordance with the embodiments herein, the third data table is configured to store the numerical identifier indicating the source data table from which a relationship begins, and the numerical identifier indicating the source data table at which the relationship terminates.

In accordance with the embodiments herein, the third data table is configured to store the first identifier identifying the column from which the relationship begins, the third data table further configured to store the first identifier identifying the column to which the relationship points.

The embodiments herein envisage a computer implemented method for enabling investigative data analytics. The method, in accordance with the embodiments herein comprises the following steps:

receiving source data in tabular format from a plurality of sources, using a data loader;

reorganizing, using the processor, the data contained in source data tables, and the corresponding metadata into at least one first data table, second data table and third data table;

assigning unique numerical identifiers to respective source data tables; assigning unique first identifiers to each of the columns of respective source data tables, and linking the first identifiers to at least one of the unique numerical identifiers;

storing the numerical identifiers, the first identifiers, and original names of respective source data tables, in the first data table;

mapping a plurality of second identifiers to the respective first identifiers stored in the first table, and mapping a plurality of third identifiers to the respective numerical identifiers stored in the first table;

storing the second identifiers, the third identifiers and the data reorganized by the processor, in the second data table, and linking the data reorganized by the processor to the second identifiers and the third identifiers;

storing the numerical identifiers representing respective source data tables, in the form of unidirectional relationship notations, in the third data table;

receiving at least one keyword in the form of a query from a user;

querying the first table, using a query builder, and identifying the source data table relevant to the keyword;

determining from the first table, the numerical identifier corresponding to the identified source data table;

identifying from the first table, the first identifiers linked to the identified unique numerical identifier; and querying the second data table to identify the second identifiers mapped onto the first identifiers, and querying the second data table to identify the third identifiers mapped to the identified numerical identifier;

querying the second data table to elicit the data linked to the second identifiers and third identifiers; and displaying elicited data to the user along with information including the source data table name and source data table column name, in which the elicited data was located.

In accordance with the embodiments herein, the method further includes the following steps:

loading the received source data in tabular form into a distributed file system such as the Hadoop Distributed File System (HDFS), using the data loader; and processing the source data tables loaded onto the HDFS, using the processor.

In accordance with the embodiments herein, the step of storing the second identifiers, the third identifiers and the data reorganized by the processor, in the second data table further includes the step of storing the second identifiers, the third identifiers and the data reorganized by the processor, as an inverted list.

In accordance with the embodiments herein, the method includes the following steps:

storing, in the third data table, the numerical identifier indicating the source data table from which a unidirectional relationship begins, and the numerical identifier indicating the source data table at which the relationship terminates; and storing, in the third data table, the first identifier identifying the column from which the relationship begins, and the first identifier identifying the column to which the relationship points.

BRIEF DESCRIPTION OF THE DRAWINGS

These and the other features, aspects, and advantages of the embodiments herein will become apparent when the following detailed description is analyzed in conjunction with the accompanying drawings in which like characters represent like parts throughout, and wherein.

DETAILED DESCRIPTION OF THE EMBODIMENTS

The embodiments herein envisages database server that supports investigative analytics. Typically, investigative analytics is an activity that warrants the users (performing investigative analytics) to be able to freely navigate through the data and query the data without having to understand the underlying structure of the data, and the relationships thereof. The database server envisaged by the embodiments herein is characterized by free form querying, access to diversified data sources, instant data integration, advanced analytical features, high performance, and access to data up to the last level of detail.

The database server envisaged by the embodiments herein stores the data is a manner completely different from existing data storage technologies (for example, SQL, NoSQL and the like). The database server enables users to formulate the queries covering all the possible aspects (scenarios), without warranting the users to be aware of the location of data and the structure thereof. The database server supports advanced analytical capabilities including but not restricted to data sampling, data classification, data regression and data clustering. Further, the database server envisaged by the embodiments herein provides for creation and seamless embedding of analytical workflows.

In order to support investigative analytics, and to deal with dynamic data structures, and to offer free form queries, the database server envisaged by the embodiments herein organizes the data in a non-traditional (non-conventional) manner. The database server envisaged by the embodiments herein stores the data and the corresponding metadata in such a manner that they can be seamlessly linked.

Figure 1:
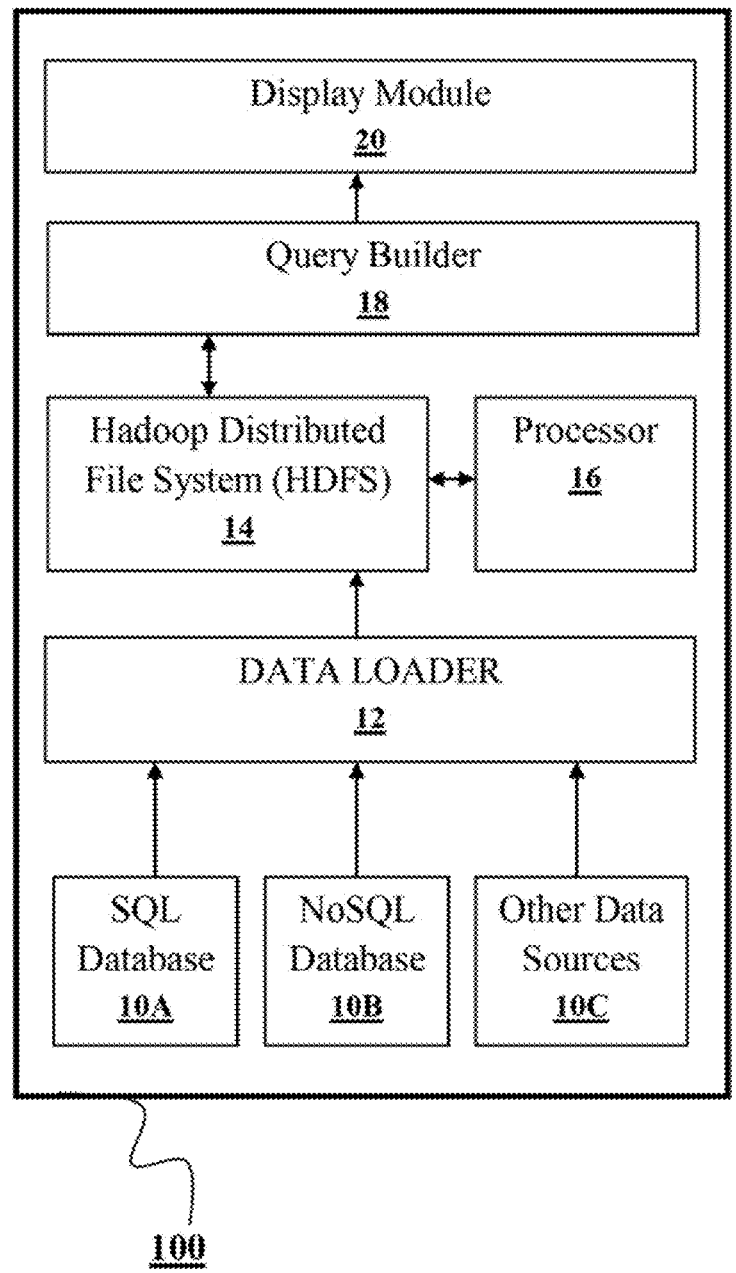
FIG. 1 is a block diagram illustrating the functional components of the analytic database server according to one embodiment herein.

Referring to FIG. 1, there is shown a block diagram illustrating components of the database server 100, in accordance with the embodiments herein. The database server 100 includes a data loader denoted by the reference numeral 12. The data loader 12 receives data from a plurality of data sources including SQL databases 10A, NoSQL databases 10B, and other data sources collectively denoted by 10C. The other data sources 10C include, but are not restricted to XML (extended markup language) data sources, HTML (Hyper text markup language) data sources, PDF documents social media applications including Twitter, Facebook and LinkedIn, images, log files, MS Office applications and the like. The data loader 12 converts the received data into a tabular format, thereby creating a plurality of data tables (referred to as 'source data tables' hereafter) which are subsequently loaded onto a distributed file system.

In accordance with an exemplary embodiment herein, the data loader 12 is configured to identify the Cartesian coordinates (x,y,z) of the received data, wherein 'x' stands for the name of the data source, 'y' stands for the name of the column (column ID) in which the data is stored, and 'z' stands for the row (row ID) in which the data is stored. In this manner, the data loader 12 captures the Cartesian coordinates of each of the data elements, thereby providing for the data elements to be located/identified based on the corresponding Cartesian coordinates.

In accordance with the embodiments herein, the data received by the data loader 12 is loaded on to a Hadoop Distributed File System (HDFS) 14. A processor denoted by the reference numeral 16 processes the data stored in the HDFS 14, and reorganizes the data stored in the HDFS 14, and the corresponding metadata into at least three data tables, including a first data table, a second data table and a third data table.

In accordance with an exemplary embodiment herein, Table 1 and Table 2 provided herein below illustrate the data tables loaded onto the HDFS 14, by the data loader 12. Table 1 is termed as 'SALES_PERSONS' table, and Table 2 is termed 'REGION' table.

TABLE 1

'Sales_Persons' table comprising information about sales achieved by individuals

| Name | Region | Total_Sale | Record_id |
|------|--------|------------|-----------|
| Tom  | UP     | 10         | 1         |
| Dick | KE     | 20         | 2         |

In accordance with the embodiments herein Table 2 illustrates 'REGION' table which incorporates details corresponding to the various regions at which sales are conducted.

TABLE 2

'Region' table comprising information about sales achieved by individuals

| ID | Region | Country | Record_id |
|----|--------|---------|-----------|
| 10 | UP     | India   | 1         |
| 11 | KE     | India   | 2         |

The Table 3 provided herein below illustrates the structure of the 'first data table', in accordance with the embodiments herein. The 'first data table', in accordance with the embodiments herein is preferably a schema table. The 'first data table' holds a record for each source data table/source data file, i.e., for every source data table preset, the 'first data table' would hold a column. In this case, the 'first data table' would hold a record corresponding to the 'SALES_PERSONS' table, and a record corresponding to the 'REGION' table.

TABLE 3

First Data Table

|    |      |             | Column Info |             |      |
| -- | ---- | ----------- | ----------- | ----------- | ---- |
| ID | Name | Actual_Name | Name        | Actual_Name | Type |
| 1  | −1   | Sales_Persons | −1        | Name        | Text |
|    |      |             | −2          | Region      | Text |
|    |      |             | −3          | Total_Sale  | Num  |
| 2  | −2   | Region      | −1          | Id          | Num  |
|    |      |             | −2          | Region      | Text |
|    |      |             | −3          | Country     | Text |

In accordance with the embodiments herein, the processor 16, while reorganizing the data from the Table 1 (SALES_PERSONS) and Table 2 (REGION) into the 'first data table', allocates a numeric identifier (as shown in the 'Name' column of Table 3) to both the tables (Table 1 and table 2). The 'Name' is typically a unique numerical value. As shown in Table 3, the numeric identifier '−1' is allocated to the 'SALES_PERSONS' Table, and the numeric identifier '−2' is allocated to the 'REGION' table. The 'Actual_Name' column of 'Table 3' denotes the original names of both the tables (Table 1 and Table 2).

In accordance with the embodiments herein, the 'first data table' further comprises a column termed as 'Column Info'. The said column comprises at least three sub-columns. The column 'Column Info' incorporates information corresponding to Table 1 and Table 2 (the source data tables loaded onto HDFS 14 by the data loader 12).

The processor 16, while reorganizing the data located in the source data tables, allocates a unique identifier (the sub-column 'name' in 'Column Info' column) to each of the columns of each of the source data tables. That is, the source data table 'SALES_PERSONS' incorporates three columns namely 'Name', 'Region' ad 'Total_Sale'. The processor 16 therefore allocates three unique first identifiers, i.e., '−1' is allocated to 'Name', '−2' is allocated to 'Region' and '−3' is allocated to 'Total_Sale', and the allocated first identifiers are stored in the 'Name' sub-column of the column 'Column Info'. The sub-column 'Actual_Name' (of the column 'Column Info') stores the original names of each of the columns of each of the source data tables (Table 1 and Table 2). 'The same procedure is undertaken by the processor 16 for the 'REGION' Table.

In accordance with the embodiments herein, the 'second data table' is illustrated as Table 4. For every data element found in the source data tables, a 'record' is inserted in the 'second data table'. The Table 4 comprises the information originally stored in the source data tables (Table 1 and Table 2), albeit in a reorganized manner, along with corresponding second (unique) identifiers and third (unique) identifiers.

TABLE 4

Second Data Table

| Record_id | Content | Field Name | Source Name | Unique_id |
| --------- | ------- | ---------- | ----------- | --------- |
| 1         | Tom     | −1         | −1          | 1         |
| 1         | UP      | −2         | −1          | 2         |
| 1         | 10      | −3         | −1          | 3         |
| 2         | Dick    | −1         | −1          | 4         |
| 2         | KE      | −2         | −1          | 5         |
| 2         | 20      | −3         | −1          | 6         |
| 1         | 10      | −1         | −2          | 7         |
| 1         | UP      | −2         | −2          | 8         |
| 1         | India   | −3         | −2          | 9         |
| 2         | 11      | −1         | −2          | 10        |

TABLE 4-continued

Second Data Table

| Record_id | Content | Field Name | Source Name | Unique_id |
| --------- | ------- | ---------- | ----------- | --------- |
| 2         | KE      | −2         | −2          | 11        |
| 2         | India   | −3         | −2          | 12        |

In accordance with the embodiments herein, the 'second data table' and specifically the 'content' column of the 'second data table' stores the data contained in the source data tables (table 1 and Table 2), albeit in the form of an inverted list. For example, the contents of 'SALES PERSONS' table, i.e., 'Tom', 'UP', '10', 'Dick', 'KE', '20' are stored in the 'Content' column of the 'second data table' as an inverted list. Further, the contents of 'REGION' table, i.e., '10', 'UP', 'India', '11', 'KE', 'India' are also stored in the 'Content' column of the second data table.

The element 'Tom' is present in the 'Name' column of Table 1 (source data table SALES_PERSONS). The 'Name' column is allocated a first identifier '−1' (as indicated by 'Name' and 'Actual_Name' sub-columns of the column termed 'Column Info' which is present in the 'first data table'). Therefore, it is implied that every element present in the 'Name' column of the source data table (Table 1) is associated with the first identifier '−1'. Therefore, the elements "Tom' and 'Dick' which belong to the 'Name' column of the source data table (Table 1) are also associated with the first identifier '−1'. Similarly, the values 'UP' and 'KE' which belong to the column 'Region' in the Table 1 (SALES_PERSONS) are allocated a first identifier '−2's respectively, since the column 'Region' is associated with the first identifier '−2' in the 'first data table'. Similarly, the values '10', and '20' which belong to the column 'Total-Sale' in the table 1 (SALES_PERSONS) are allocated a first identifier '−3' respectively, since the column 'Total_Sale' is associated with the first identifier '−3' in the first data table'

The identifiers stored in the 'Field Name' column of the 'second data table' map to the first identifiers, and are termed as 'second identifiers' since they are found in the 'second data table'. The second identifiers are directly mapped to the respective first identifiers and inherit the values of the second identifiers. The processor 16, while allocating a second identifier to the element 'Tom' looks up the first data table and determines that element value 'Tom' is associated with the first identifier '−1'. Therefore, the second identifier allocated to 'Tom' is '−1'. Similarly, the processor 16, while allocating a second identifier to the element 'UP' looks up the first data table and determines that the element 'UP' is associated with the first identifier '−2'. Therefore, the second identifier allocated to 'UP' is '−2'. Similarly, the processor 16, while allocating a second identifier to the element '10' looks up the first data table and determines that the element '10' is associated with the first identifier '−3'. Therefore, the second identifier allocated to '10' is '−3'.

The values of the second identifiers are equivalent to, and inherited from the first identifiers. The column 'Source Name' incorporates a plurality of third identifiers. The third identifiers are directly mapped onto, and inherited from the numerical identifiers which are assigned to each of the source data tables ('−1' for 'Table 1', and '−2' for 'Table 2'). Therefore, the element 'Tom', 'UP' and '10' of the column 'Content' in the 'second data table' would be associated with '−1' (the 'Source Name' column) since they are a part of Table 1 which is allocated a numeric identifier '−1'. Similarly, the elements '10', 'UP' and 'India' would be associated with '−2' (the source name column) since they are a part of Table 2 which is allocated a numeric identifier '−2'.

In the aforementioned manner, the processor 16 constructs the 'first data table' and the 'second data table' with the data and metadata derived from the source data tables (Table 1: SALES_PERSONS and Table 2: REGION).

The third data table, in accordance with the embodiments herein, holds the relationships, typically the unidirectional relationships between the source tables. In third data table, the tables are identified by the corresponding unique numeric identifiers, whereas the columns from where the relationships start and terminate are indicated by the corresponding first identifiers.

TABLE 5

Third Data Table

| Source | Target | Link_From | Link_To |
|--------|--------|-----------|---------|
| −1     | −2     | −2        | −2      |
| −2     | −1     | −2        | −2      |

A unidirectional relationship that can be implied from the two source data tables 'SALES_PERSONS' and 'REGION', wherein the first unidirectional relationship points from the column 'REGION' in the table 'SALES_PERSONS' to the column 'REGION' in the 'REGION' table. The second unidirectional relationship points the other way around, from the column 'REGION' in 'REGION' table to the column 'REGION' in the table 'SALES_PERSONS'. For each relationship four columns are stored in the 'third data table'. The columns are explained below:

SOURCE: The identifier of the table where the relationship starts.
TARGET: The identifier of the table to which the relationship points.
LINK_FROM: The identifier of the column in the table from where the relationship starts.
LINK_TO: The identifier of the column in the table to which the relationship points.

Relationships are derived automatically by the database server 12, based on the type of the columns, and the content of the columns. In addition, users are also allowed to define their own relationships. This feature makes it possible to transform undefined relationships into defined relationships.

In accordance with the embodiments herein, the processor 16 reconstructs a record from the source data tables (Table 1: SALES_PERSONS and Table 2: REGION), by querying the first data table (Table 3) and the second data table (Table 4). For example, to reconstruct the first record in the SALES_PERSONS table, the corresponding numerical identifier is determined by querying the first data table using the 'Actual_Name' column and 'Name' column. The numerical identifier corresponding to the SALES_PERSONS table is −1. Next, the processor 16 determines the first identifiers linked to the numerical identifier '−1', and the first identifiers are determined to be respectively '−1', '−2', and '−3'. Then, the processor 16 accesses the second data table to find all the records where SOURCE_NAME (numerical identifier) equals '−1' and FIELD_NAME (second identifier) equals '−1', '−2', or '−3'. Finally, the processor 16 displays all the elements making up the original record, via a display module 20.

In accordance with the embodiments herein, the database server 12 further includes a query builder denoted by the reference numeral 18. The query builder 18 enables a user to formulate and execute queries. The database server 100 organizes the data in such a way that a fully free form style of querying is permitted, which makes it ideal for investigative analytics.

For example, the in order to determine Boston-based customers, the user only has to enter the word 'Boston' as a keyword to the query builder 18. Subsequently, the query builder lists all the columns that contain the word Boston:
  Source: CUSTOMERS Field: ADDRESS_CITY
  Source: CUSTOMERS Field: DELIVERY_CITY
  Source: DELIVERIES Field: CITY The list is generated by locating the element 'Boston' in the 'second data table'. When found, the query builder indicates the 'columns' and the corresponding 'source data tables' in which the element 'Boston' appears. Then, the user then picks an appropriate 'column', and the query builder 18 generates the following query:
  SELECT CUSTOMERS.ADDRESS_CITY
  FROM CUSTOMERS
  WHERE CUSTOMERS.ADDRESS_CITY='Boston'

The user can add other columns and filters in the same manner. So, the user does not have to know beforehand the structure of the data tables, or the location of the data in the data columns. This phenomenon is especially relevant for new data sources that haven't been studied by the users yet. After a new data source has been loaded, the user can start querying. By suggesting which columns or tables to access, the database server 100 guides the user in developing his queries.

In accordance with the embodiments herein, links between words can be defined to enrich the querying capabilities. If a user looks for the word 'USA', the query builder 18 also finds the records where the names United States or United States of America are used, provided these words have been defined as synonyms of one another.

The query builder 18 uses the relationships defined in the third data table when data is queried. If a user wishes to find the names of the sales people who have sold products in India, the user would have to enter the keyword 'India'. The query builder 18 displays the following results via the display module 20.
  Source: REGION Field: COUNTRY
  The generated query becomes:
  SELECT REGION.COUNTRY
  FROM REGION
  WHERE REGION.COUNTRY='India'

Subsequently, the user types the keyword NAME after COUNTRY in the SELECT-clause of the statement:
  SELECT REGION.COUNTRY, NAME
  FROM REGION
  WHERE REGION.COUNTRY='India'

The query builder 18 displays the tables in which the column NAME appears and with which the 'REGION' table has a relationship. The table having the 'NAME' column and a relationship with the 'REGION' table is 'SALES_PERSONS' table. When the 'SALES_PERSONS' table is selected, the query is expanded with a join:
  SELECT REGION.COUNTRY, SALES_PERSONS.NAME
  FROM REGION JOIN SALES_PERSONS ON REGION.REGION=SALES_PERSONS.REGION
  WHERE REGION.COUNTRY='India'

In another example, if a user wishes to know the addresses of a customer called Robert, the query would be:
  SELECT ADDRESS
  WHERE CUSTOMER_NAME='Robert'

The query builder 18 locates all the customers in both source data tables (SALES_PERSONS and REGION) named 'Robert'.

Figure 2:
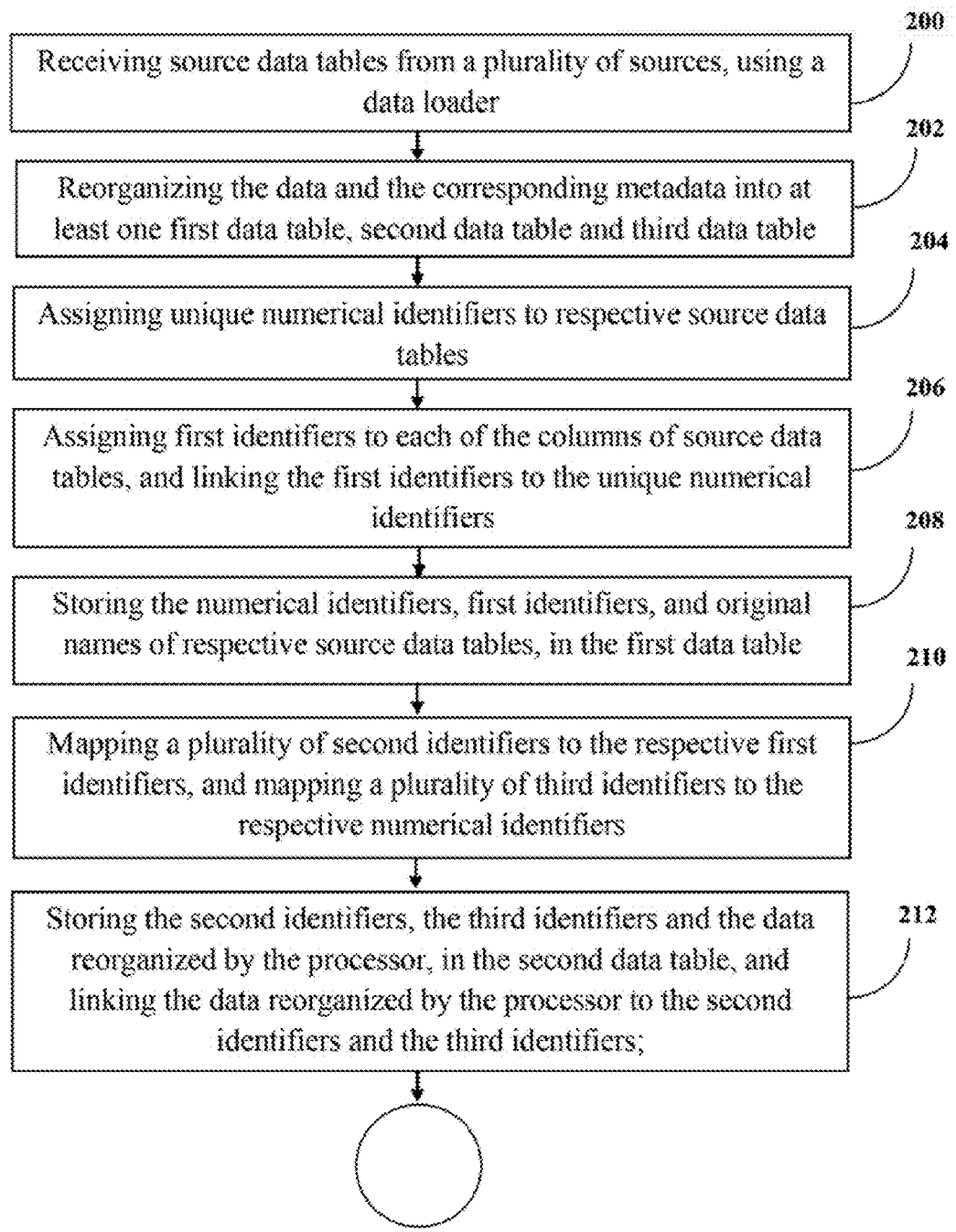
FIG. 2, FIG. 2A and FIG. 2B in combination illustrate a flow chart describing the steps involved in the computer implemented method for performing investigative data analytics, according to one embodiment herein.
Figure 2A:
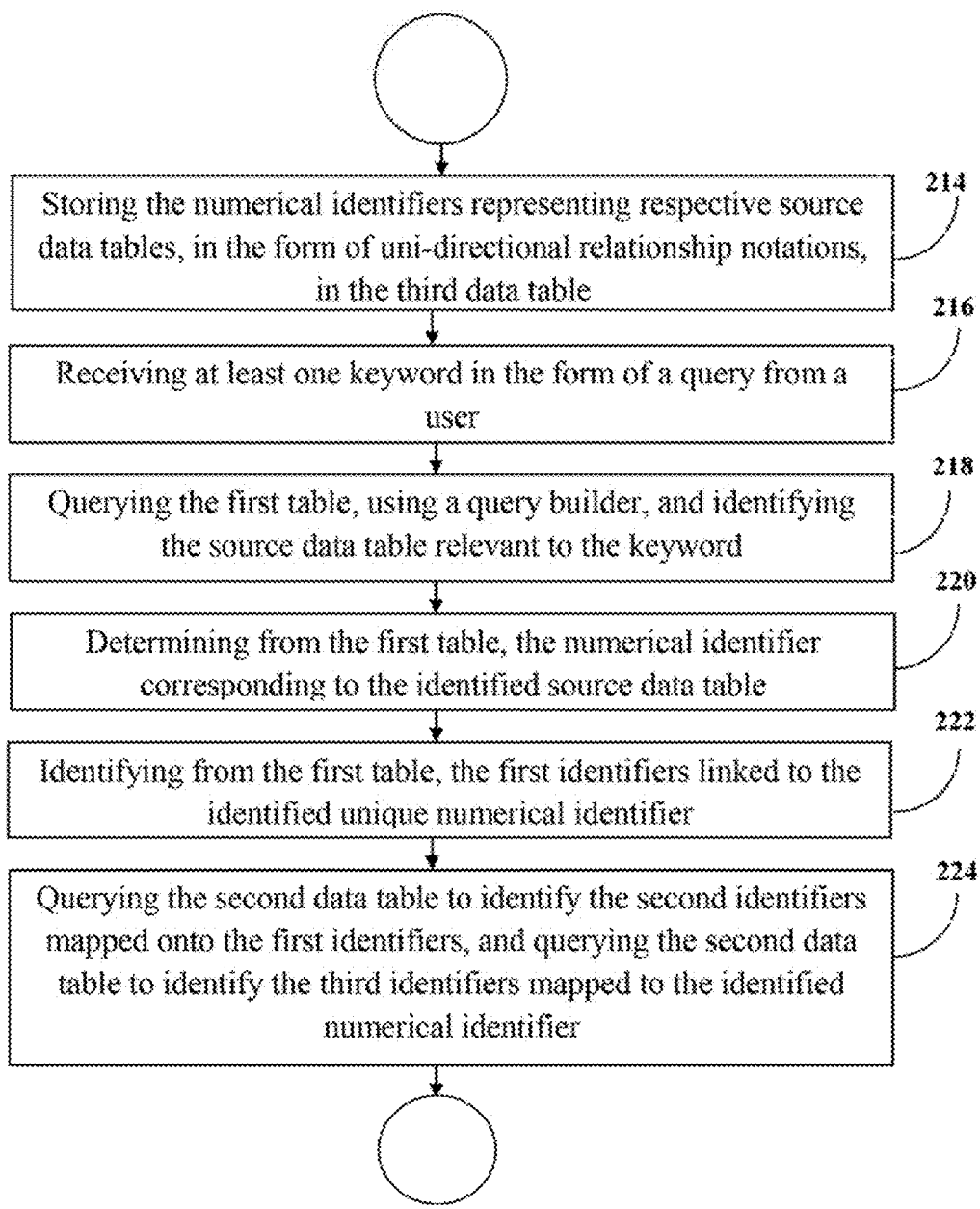
Figure 2B:
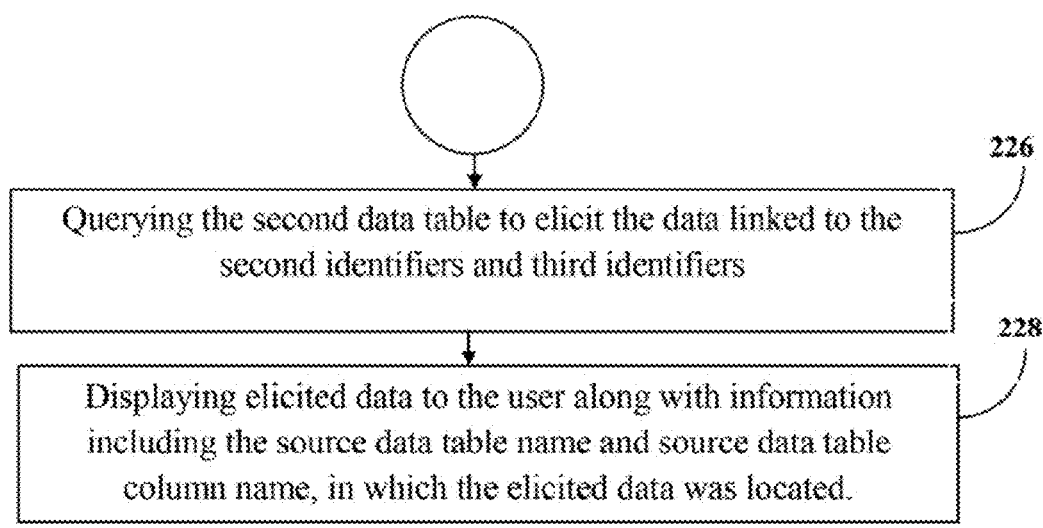

Referring to FIG. 2, FIG. 2A and FIG. 2B, there is shown a flow chart illustrating the steps involved in the computer implemented method for enabling investigative data analytics. The method, in accordance with the embodiments herein includes the following computer implemented steps:
- receiving source data tables from a plurality of sources, using a data loader (200);
- reorganizing, using the processor, the data contained in the source data tables and the corresponding metadata into at least one first data table, second data table and third data table (202);
- assigning unique numerical identifiers to respective source data tables (204);
- assigning unique first identifiers to each of the columns of respective source data tables, and linking the first identifiers to at least one of the unique numerical identifiers (206);
- storing the numerical identifiers, the first identifiers, and original names of respective source data tables, in the first data table (208);
- mapping a plurality of second identifiers to the respective first identifiers stored in the first table, and mapping a plurality of third identifiers to the respective numerical identifiers stored in the first table (210);
- storing the second identifiers, the third identifiers and the data reorganized by the processor, in the second data table, and linking the data reorganized by the processor to the second identifiers and the third identifiers (212);
- storing the numerical identifiers representing respective source data tables, in the form of unidirectional relationship notations, in the third data table (214);
- receiving at least one keyword in the form of a query from a user (216);
- querying the first table, using a query builder, and identifying the source data table relevant to the keyword (218);
- determining from the first table, the numerical identifier corresponding to the identified source data table (220);
- identifying from the first table, the first identifiers linked to the identified unique numerical identifier (222);
- querying the second data table to identify the second identifiers mapped onto the first identifiers, and querying the second data table to identify the third identifiers mapped to the identified numerical identifier (224);
- querying the second data table to elicit the data linked to the second identifiers and third identifiers (226); and
- displaying elicited data to the user along with information including the source data table name and source data table column name, in which the elicited data was located (228).

In accordance with the embodiments herein, the method further includes the following steps:
- loading the received source data tables onto a distributed file system such as a Hadoop Distributed File System (HDFS), using the data loader; and
- processing the source data tables loaded onto the HDFS, using the processor.

In accordance with the embodiments herein, the step of storing the second identifiers, the third identifiers and the data reorganized by the processor, in the second data table further includes the step of storing the second identifiers, the third identifiers and the data reorganized by the processor, as an inverted list.

In accordance with the embodiments herein, the method includes the following steps:
- storing, in the third data table, the numerical identifier indicating the source data table from which a unidirectional relationship begins, and the numerical identifier indicating the source data table at which the relationship terminates; and
- storing, in the third data table, the first identifier identifying the column from which the relationship begins, and the first identifier identifying the column to which the relationship points.

The technical advantages of the embodiments herein include the realization of a computer implemented, analytical database server that enables users to perform investigative analytics. The database server provides for users to query for data/information, without being restricted by the underlying data structures, without having to understand all the undefined relationships and without having to know what each of the data columns actually mean. The database server organizes the data in a non-traditional structure. The database server organizes the data in a manner that gives the impression that the data values themselves are stored individually together with their metadata. The database server enables users to freely browse and analyze all the available data. The database server allows for data elements that have not been associated before to be related with one another, thereby enabling users to discover unknown relationships.

The database server envisaged by the embodiments herein accesses all kinds of data including the data stored in Excel files, CSV files, documents with JSON structures, Hadoop files, NoSQL databases and the like. The database server accesses the aforementioned database servers without having the need to physically integrate the data beforehand. The database server makes the data instantly available for analysis, rather than necessitating an analysis of the structure of the data source and contents thereof, prior to making the data available. The database server employs a plurality of analytical tools including but not restricted to clustering tools, forecasting tools and classification tools, to present the data to the user in an appealing yet meaningful format. The database server envisaged by the embodiments herein is a performance oriented system that efficiently and effectively supports the process of investigative data analytics. Further, the database server allows the users to access data up to the lowest level of detail, thereby providing for efficient investigative data analysis.

The database server does not mandate the user to be aware of the data structure of the (data) tables and columns thereof. The database server does not mandate the users to understand the data structures. The users when using the database server need not emphasize on the elements in which the data organized, and what the hierarchical (data) structure is, but could concentrate only upon querying the data and extracting relevant results therefrom. The database server does not warrant the user to explicitly specify the files/tables and elements to be accessed for data retrieval. Further, the database server supports queries that are dynamic in nature.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

We claim:

1. A computer implemented analytical database server, said database server comprising:
   a data loader configured to receive data tables from a plurality of sources, said data loader further configured convert the received data into a tabular format to create a plurality of source data tables, said data loader configured to load the source data tables onto a Hadoop Distributed File System (HDFS);
   a processor cooperating with said Hadoop Distributed File System to process the data loaded thereto, said processor further configured to reorganize the data and the corresponding metadata into at least one first data table, second data table and third data table, wherein:
      said first data table comprises unique numerical identifiers assigned to respective source data tables, said first data table further comprising unique first identifiers corresponding to each of the columns of respective source data tables, said unique first identifiers linked to at least one of said unique numerical identifiers, said first data table further comprising the original names of respective source data tables;
      said second data table comprising a plurality of second identifiers mapped to the respective first identifiers stored in said first table, a plurality of third identifiers mapped to the respective numerical identifiers stored in said first table, said second data table further configured to store the data reorganized by the processor, wherein the data reorganized by the processor is linked to said second identifiers and said third identifiers;
      said third data table configured to store the unique numerical identifiers representing respective source data tables, in the form of unidirectional relationship notations; and
   a query builder configured to receive at least one keyword from a user, said query builder further configured to:
      query said first table to identify the source data table relevant to said keyword;
      determine from said first table, the unique numerical identifier corresponding to the identified source data table;
      identify from said first table, the first identifiers linked to the identified unique numerical identifier; and
      query the second data table to identify the second identifiers mapped onto said first identifiers, and query the second data table to identify the third identifiers mapped to the identified numerical identifier;
      query the second data table to elicit the data linked to said second identifiers and third identifiers, and display elicited data to the user along with information including the source data table name and source data table column name, in which the elicited data was located;
   said query builder further configured to dynamically modify the generated query in response to the keywords provided by said user.

2. The database server as claimed in claim 1, wherein said second data table is configured to store the data reorganized by said processor, in the form of an inverted list.

3. The database server as claimed in claim 1, wherein said first identifier and second identifier are equivalent.

4. The database server as claimed in claim 1, wherein said third data table is configured to store the numerical identifier indicating the source data table from which a relationship begins, and the numerical identifier indicating the source data table at which the relationship terminates.

5. The database server as claimed in claim 1, wherein said third data table is configured to store the first identifier identifying the column from which the relationship begins, said third data table further configured to store the first identifier identifying the column to which the relationship points.

6. A computer implemented method for enabling investigative data analytics, said method comprising the following computer implemented steps:
   receiving data from a plurality of sources, using a data loader, and converting the received data into a tabular format to create a plurality of source data tables;
   reorganizing, using a processor, the data and the corresponding metadata into at least one first data table, second data table and third data table;
   assigning unique numerical identifiers to respective source data tables; assigning unique first identifiers to each of the columns of respective source data tables, and linking said first identifiers to at least one of said unique numerical identifiers;
   storing said numerical identifiers, said first identifiers, and original names of respective source data tables, in said first data table;
   mapping a plurality of second identifiers to the respective first identifiers stored in said first table, and mapping a plurality of third identifiers to the respective numerical identifiers stored in said first table;
   storing said second identifiers, said third identifiers and the data reorganized by the processor, in said second data table, and linking the data reorganized by the processor to said second identifiers and said third identifiers;
   storing said numerical identifiers representing respective source data tables, in the form of unidirectional relationship notations, in said third data table;
   receiving at least one keyword in the form of a query from a user;
   querying said first table, using a query builder, and identifying the source data table relevant to said keyword;
   determining from said first table, the numerical identifier corresponding to the identified source data table; identifying from said first table, the first identifiers linked to the identified unique numerical identifier;

querying the second data table to identify the second identifiers mapped onto said first identifiers, and querying the second data table to identify the third identifiers mapped to the identified numerical identifier;

querying the second data table to elicit the data linked to said second identifiers and third identifiers; and displaying elicited data to the user along with information including the source data table name and source data table column name in which the elicited data was located.

7. The method as claimed in claim 6, wherein the method further includes the following steps:

loading the received data, in a tabular format, onto a Hadoop Distributed File System (HDFS), using said data loader; and processing the source data tables loaded onto the HDFS, using the processor.

8. The method as claimed in claim 6, wherein the step of storing said second identifiers, said third identifiers and the data reorganized by the processor in said second data table further includes the step of storing said second identifiers, said third identifiers and the data reorganized by the processor, as an inverted list.

9. The method as claimed in claim 6, wherein the method includes the following steps:

storing, in the third data table, the numerical identifier indicating the source data table from which a unidirectional relationship begins, and the numerical identifier indicating the source data table at which the relationship terminates; and storing, in the third data table, the first identifier identifying the column from which the relationship begins, and the first identifier identifying the column to which the relationship points.

\* \* \* \* \*